US008175075B2

(12) United States Patent
Zhang

(10) Patent No.: US 8,175,075 B2
(45) Date of Patent: May 8, 2012

(54) ADAPTIVE HEADER COMPRESSION IN A WIRELESS COMMUNICATION NETWORK

(75) Inventor: Qinqing Zhang, Morganville, NJ (US)

(73) Assignee: Alcatel Lucent, Paris (FR)

( * ) Notice: Subject to any disclaimer, the term of this patent is extended or adjusted under 35 U.S.C. 154(b) by 1152 days.

(21) Appl. No.: 11/644,894

(22) Filed: Dec. 26, 2006

(65) Prior Publication Data
US 2008/0151861 A1 Jun. 26, 2008

(51) Int. Cl.
*H04J 3/24* (2006.01)
(52) U.S. Cl. ........ 370/349; 455/502; 455/517; 370/254; 370/477
(58) Field of Classification Search .......... 370/254, 370/477; 455/502, 517
See application file for complete search history.

(56) References Cited

U.S. PATENT DOCUMENTS 6,970,476 B1 * 11/2005 Jonsson et al. ............ 370/401
7,539,130 B2 * 5/2009 Le et al. .................... 370/216
2003/0090397 A1   5/2003 Rasmussen
2005/0090273 A1 * 4/2005 Jin et al. ................... 455/502
2005/0195750 A1 * 9/2005 Le et al. .................... 370/252
2007/0058679 A1 * 3/2007 Pelletier et al. ............ 370/477
2008/0080559 A1 * 4/2008 Singh ......................... 370/477

FOREIGN PATENT DOCUMENTS

WO    WO 00/51307       8/2000
WO    WO 03/096647     11/2003

OTHER PUBLICATIONS

Notification of Transmittal of the International Preliminary Report on Patentability dated Mar. 17, 2009.
International Search Report dated Jul. 17, 2008 for International Application No. PCT/US2007/025779.

* cited by examiner

*Primary Examiner* — Kwasi Karikari
(74) *Attorney, Agent, or Firm* — Harness, Dickey & Pierce, P.L.C.

(57) ABSTRACT

In one embodiment, whether packet loss of link layer packets at a receiver has exceeded a lost threshold is detected. Feedback is sent to a transmitter indicating that a header compressor, for compressing higher layer packets at the transmitter, should send a less compressed header if the packet loss of the link layer packets has exceeded the lost threshold. The higher layer packets are at a higher layer than the link layer and are formed by the link layer packets.

24 Claims, 6 Drawing Sheets

ADAPTIVE HEADER COMPRESSION IN A WIRELESS COMMUNICATION NETWORK

BACKGROUND OF THE INVENTION

The Internet Protocol (IP) has become the dominant transport protocol in both wireline and wireless networks, which has led to the convergence of telecommunication and data networks. In many services and applications (e.g., Voice over IP (VoIP), interactive games, instant messaging, etc.), the payload of an IP packet is almost of the same size or even smaller than the header. In addition to the IP network protocol, other protocols (e.g., real-time protocol (RTP), user datagram protocol (UDP), etc.) are added to the original information bits for effective transport in a packet data network.

Fortunately, it is not necessary to send the enormous RTP/UDP/IP header for each packet all the time. Instead a header compression algorithm such as the robust header compression (ROHC) may be used. The principle behind header compression is that most of the fields in the RTP/UDP/IP header are static; hence they can be sent once uncompressed during a first communication (e.g., the initial transmitted packets in a wireless system) from the compressor at the transmission side to the decompressor at the reception side. Once the decompressor has reliably acquired the static information, the compressor starts sending compressed headers carrying information regarding the dynamic parts of the header. From the compressed header, the decompressor is able to fully reconstruct the RTP/UDP/IP header and pass the packet on. In this way, the large headers are not transmitted for each packet, leading to tremendous savings in capacity.

However, current header compression schemes do have some drawbacks. For ease of explanation, these drawbacks will be described with respect to header compression implemented in a conventional wireless communication system.

FIG. 1 illustrates a general architecture of a well-known wireless communication network. As shown, an access terminal (AT) 10 communicates with a base station (BTS) 12 over an air interface. Examples of an AT include a mobile station, a mobile unit, a wireless phone, wireless equipped PDA or computer, etc. Multiple base stations 12 communicate with a radio network controller (RNC) 14, which provides signaling and traffic processing for each wireless data session. FIG. 1 shows the AT 10, BTS 12, RNC 14 and the interfaces between these components form what is known as a radio access network (RAN). The RAN communicates with a core network to access, for example, the internet. In the example of FIG. 1, the core network includes one or more packet data service nodes (PDSNs) 16 connected between the RNCs 14 and, for example, the internet (not shown).

As examples, header compression may occur between the AT 10 and the PDSN 16, between the AT 10 and the RNC 14, etc. When the AT 10 establishes a connection with the network, for example, a VoIP call, the application layer packet will be carried over the RTP/UDP/IP protocol stacks. The RTP/UDP/IP headers will be compressed by a compressor at the AT 10 using, for example, the ROHC algorithm mentioned above. The compressed packet will be sent uplink from the BTS 12 to the RNC 14 and from the RNC 14 to the PDSN 16. The decompressor at the RNC 14 or the PDSN 16 decompresses the ROHC header to re-establish the RTP/UDP/IP header. Similarly, on the downlink direction, the PDSN 16 and RNC 14 receive packets and the compressor at the PDSN 16 or RNC 14 compresses the RTP/UDP/IP headers to generate the ROHC or compressed header. The packet with compressed header is sent to the BTS 12 and on to the AT 10. A decompressor at the AT 10 decompresses the ROHC header to obtain the original RTP/UDP/IP header, and passes the packet onto the application layer.

FIG. 2 illustrates another architecture of a wireless communication network—the so called flat IP network architecture. As shown, the AT 10 communicates with a base station (BS) 20 over an air interface. The BS 20 converges multiple mobile network elements into a single entity and combines the signaling and bearer into one IP connection. In this flat IP architecture, the BS 20 contains all the radio access technology based functionalities. In other words, the functionalities in BTS, RNC and PDSN of FIG. 1 are be converged to the BS. The BS 20 functions like a router in the network and communicates with other BSs and network elements. Compared to FIG. 1, there are no separate RNC and PDSN elements anymore. The BS may also communicate with an access gateway 22, which provides for external connection to other networks such as the internet.

In the architecture of FIG. 2, header compression may occur between the AT 10 and the BS 20, or between the AT 10 and the access gateway 22. When the AT 10 establishes a connection with the network, for example, a VoIP call, the application layer packet will be carried over the RTP/UDP/IP protocol stacks. The RTP/UDP/IP headers will be compressed by a compressor at the AT 10 using, for example, the ROHC algorithm mentioned above. The compressed packet will be sent uplink from the AT 10 to the BS 20, or from the AT 10 to the BS 20 and from the BS 20 to the access gateway 22. The decompressor at the BS 20 or the access gateway 22 decompresses the ROHC header to re-establish the RTP/UDP/IP header. Similarly, on the downlink direction, the access gateway 22 and BS 20 receive packets, and the compressor at the access gateway 22 or the BS 20 compresses the RTP/UDP/IP headers to generate the ROHC or compressed header. The packet with the compressed header is sent to the AT 10. A decompressor at the AT 10 decompresses the ROHC header to obtain the original RTP/UDP/IP header, and passes the packet onto the application layer.

The robust header compression (ROHC) algorithm uses several encoding methods, including the window-based least significant bits encoding algorithm, for the compression of the dynamic fields in the protocol headers. The ROHC compression algorithm also incorporates a feedback mechanism. The ROHC compression algorithm is very efficient on wireless links with high error rates and/or long round trip time. Because of its efficiency and robustness, the ROHC compression algorithm is suitable on wireless networks where the radio resource is costly.

When there are large consecutive packet losses in the link layer and/or a large degree of packets out of order, the decompressor is not able to decompress newly received packets. When decompression failure happens, the decompressor will loose its context. The context of a header compression session is the state of the compressor and the state of the decompressor, and these states must be synchronized for successful header reconstruction. The decompressor usually sends a feedback packet to the compressor instructing the compressor to resynchronize the compression status by sending the full header. The decompressor will discard received packets with the compressed header, including uncorrupted packets, until the full header information is received in an uncompressed packet. As a result, during resynchronization between the compressor and decompressor, additional packet losses will occur, degrading the performance and quality of the call. These packet losses caused by loss of synchronization between the compressor and decompressor should be minimized or eliminated.

SUMMARY OF THE INVENTION

The present invention relates to adaptive header compression.

In one embodiment, whether packet loss of link layer packets at a receiver has exceeded a lost threshold is detected. Feedback is sent to a transmitter indicating that a header compressor, for compressing higher layer packets at the transmitter, should send a less compressed header if the packet loss of the link layer packets has exceeded the lost threshold. The higher layer packets are at a higher layer than the link layer and are formed by the link layer packets.

In another embodiment, whether a degree of out-of-order link layer packets at the receiver has exceeded a degree threshold is detected. Feedback is sent to a transmitter indicating that a header compressor, for compressing higher layer packets at the transmitter, should send a less compressed header if the degree of out-of-order link layer packets has exceeded the degree threshold. The higher layer packets are at a higher layer than the link layer and are formed by the link layer packets.

According to a further embodiment, decompression failure is predicted at a link layer of a receiver, and a decompressor is notified of the predicted decompression failure. Feedback is sent from the decompressor to a compressor. The feedback causes the compressor to reduce compression.

In a still further embodiment, at a transmitter, whether packet loss of transmitted link layer packets has exceeded a lost threshold is detected. Header compression of higher layer packets is reduced if the packet loss of the transmitted link layer packets has exceeded the lost threshold. The higher layer packets are at a higher layer than the link layer and are formed by the link layer packets.

In an additional embodiment, at the transmitter, whether a degree of out-of-order received link layer packets has exceeded a degree threshold is detected. Header compression of higher layer packets is reduced if the degree of out-of-order received link layer packets has exceeded the degree threshold. The higher layer packets are at a higher layer than the link layer and are formed by the link layer packets.

Yet another embodiment include detecting, at a transmitter, at least one of (i) whether packet loss of transmitted link layer packets has exceeded a lost threshold, and (ii) whether a degree of out-of-order received link layer packets has exceeded a degree threshold. A state of a compressor of higher layer packets is changed if at least one of the packet loss of the transmitted link layer packets has exceeded the lost threshold and the degree of out-of-order received link layer packets has exceeded the degree threshold. The higher layer packets are at a higher layer than the link layer and are formed by the link layer packets.

A further embodiment includes detecting whether packet loss of link layer packets at a receiver has exceeded a lost threshold, and detecting that a poor RF condition exists at the receiver. A state of a decompressor of higher layer packets is changed if the packet loss of link layer packets has exceeded the lost threshold and the poor RF condition exists at the receiver. The higher layer packets are at a higher layer than the link layer and are formed by the link layer packets.

A still further embodiment includes detecting whether a degree of out-of-order link layer packets at the receiver has exceeded a degree threshold, and detecting that a poor RF condition exists at the receiver. A state of a decompressor of higher layer packets is changed if the degree of out-of-order link layer packets at the receiver has exceeded the degree threshold and the poor RF condition exists at the receiver. The higher layer packets are at a higher layer than the link layer and are formed by the link layer packets.

BRIEF DESCRIPTION OF THE DRAWINGS

The present invention will become more fully understood from the detail description given herein below and the accompanying drawings which are given by way of illustration only, wherein like reference numerals designate corresponding parts in the various drawings, and wherein.

DETAILED DESCRIPTION OF EXAMPLE EMBODIMENTS

Figure 1:
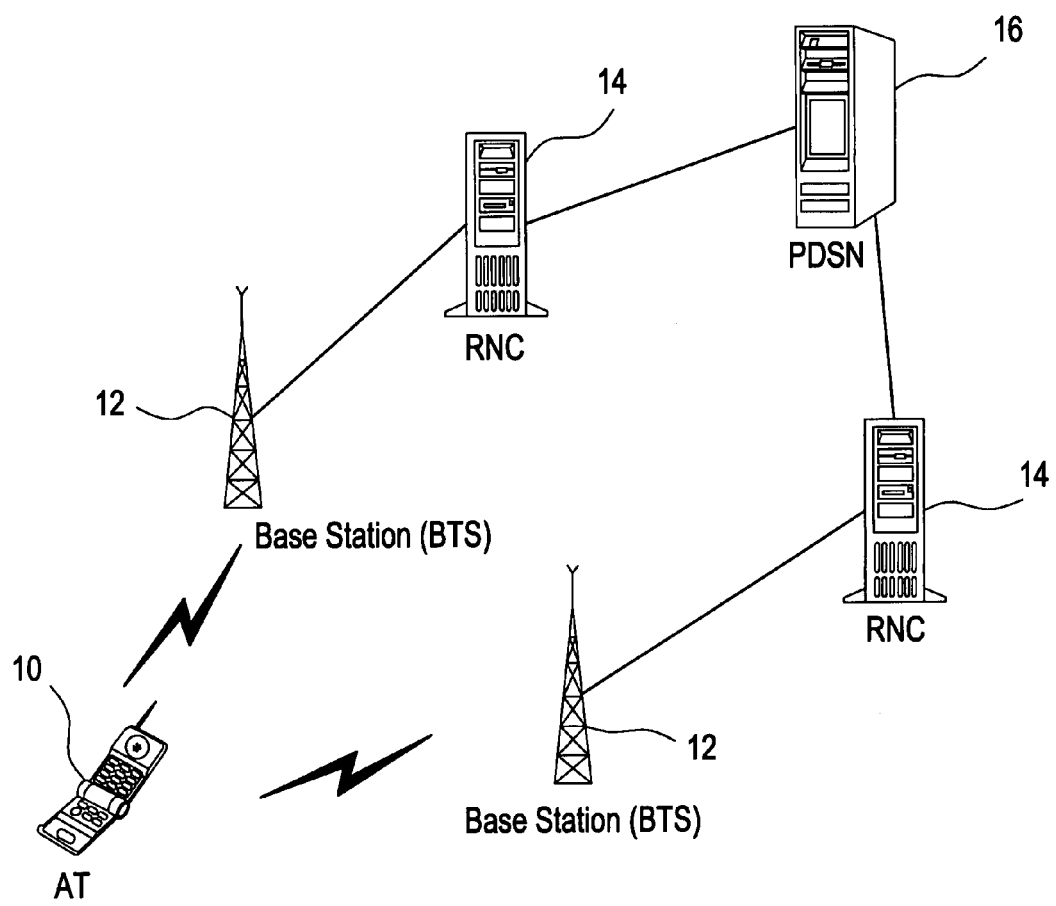
FIG. 1 illustrates a well-known wireless communication network.

Referring to FIG. 1 discussed above, data packet transmissions over the link layer of the wireless network contain information to ensure packet delivery and processing at the RAN. The robustness of header compression to packet loss is known once the compression algorithm and operation procedure is defined. Packet loss depends on the particular link of the mobile. The link layer at the radio access network (RAN) or the mobile has knowledge of this information and can pass the information to the header compressor/decompressor to help recover quickly from a decompression failure event.

As is well-known, the radio link protocol (RLP) layer has strong packet error detection code to detect whether the RLP packet is received correctly or not. If the packet has errors, the link layer will discard the packet and not pass the packet to the upper layer or the decompressor. Also, as is well-known, the RLP layer at a transmitter encapsulates the ROHC packet and provides a sequence number (SN) in an RLP header for packet delivery. The sequence number is incremented for each RLP packet transmission, and therefore, provides a mechanism for properly ordering packets received out-of-order at the receiver. As is well-known, this mechanism may also be used to recognize out-of-order and missing data packets. Therefore, the radio link layer has enough information to detect the number of packets lost.

The inventors have recognized that the link layer has sufficient information to predict whether there will be a decompression failure or not after the compressor/decompressor reaches, for example, the optimum compression/decompression state. If the link layer predicts that decompression failure will happen, according to embodiments of the present invention, the link layer may be used to speed up the resynchronization process, especially if the round trip time of sending a packet between compressor and decompressor is long.

In describing the embodiments of the present invention in more detail, the ROHC compression algorithm will be used as the example header compression algorithm. However, it will be understood that the present invention is not limited to this header compression algorithm.

Figure 2:
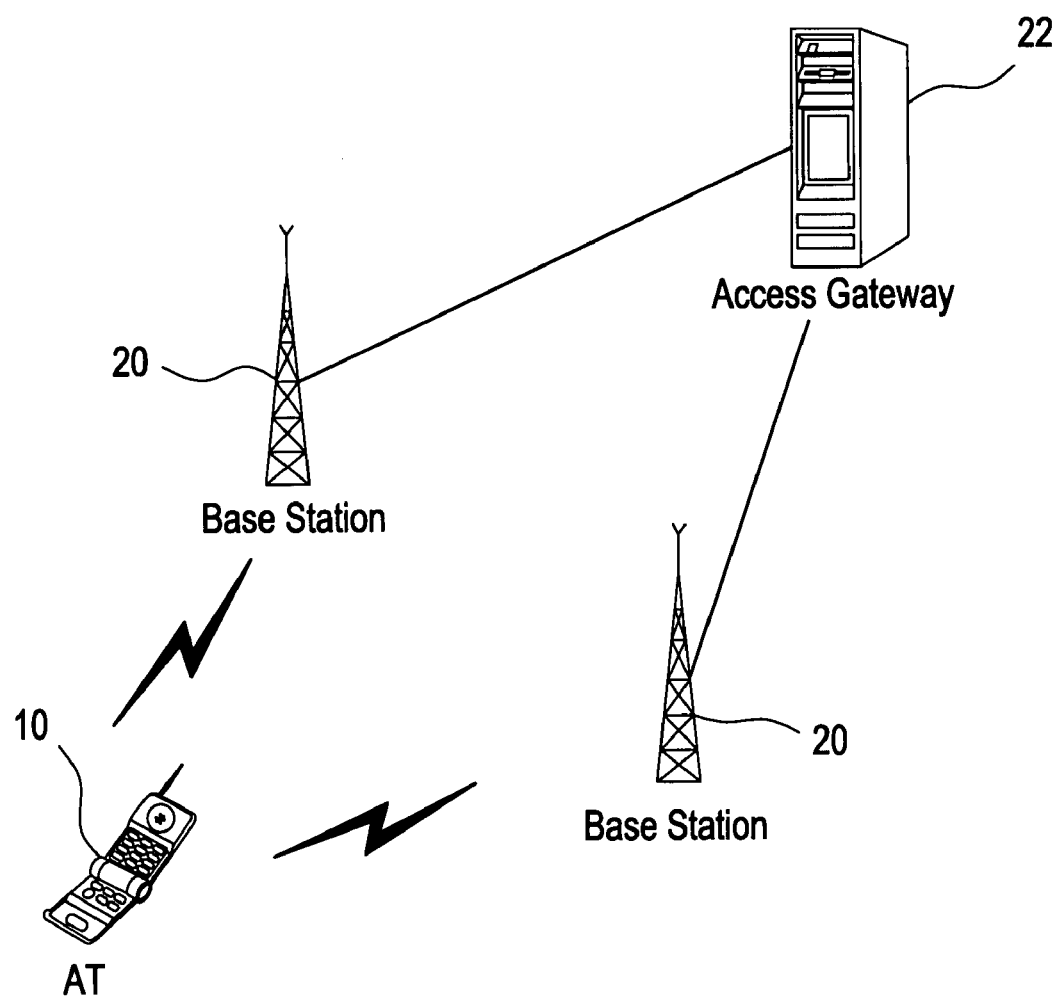
FIG. 2 illustrates a so called flat IP wireless communication network.
Figure 3:
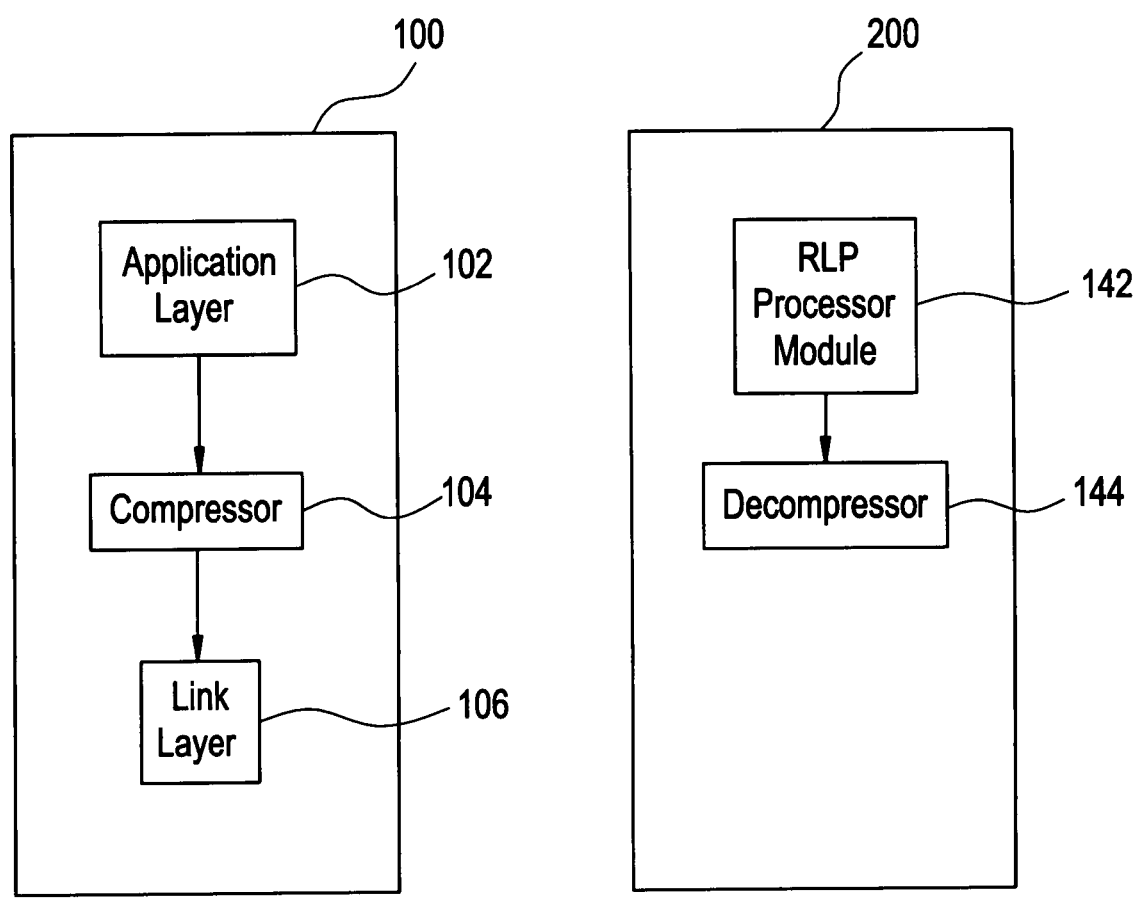
FIG. 3 illustrates the architecture of a portion of a wireless communication system according to an embodiment of the present invention.

FIG. 3 illustrates a functional block diagram of a transmitter 100 and a receiver 200. For the reverse link and the architecture of FIG. 1, the transmitter 100 resides at the AT 10 and the receiver 200 resides at one of the BTS 12, the RNC 14 and/or the PDSN 16. For the reverse link and the architecture of FIG. 2, the transmitter 100 resides at the AT 10 and the receiver 200 resides at the BS 20. For the forward link and the architecture of FIG. 1, the transmitter 100 resides at one of the BTS 12, the RNC 14 and/or the PDSN 16 and the receiver 200 resides at the AT 10 (albeit, the application layer generator 106 discussed below may be lacking). For the forward link and the architecture of FIG. 2, the transmitter 100 resides at the BS 20 and the receiver 200 resides at the AT 10 (albeit, the application layer generator 106 discussed below may be lacking).

As shown, the transmitter 100 includes an application layer IP generator 102 that generates IP packets for a particular application. For example, a VoIP call consists of voice frame(s) encapsulated into a RTP/UDP/IP packet. With the establishment of a connection, the application layer generator 102 generates an application layer packet, which via the protocol stack becomes an RTP/UDP/IP packet. A header compressor 104 compresses the RTP/UDP/IP packets into ROHC packets, for example, using the ROHC algorithm. Subsequently, a link layer packet generator 106 generates link layer packets by placing ROHC packets into RLP packets. The link layer generator 106 may perform concatenation or fragmentation on the upper layer packets. In this example, a RLP packet may include one or multiple ROHC packets. An RLP packet may also contain only a portion of a single ROHC packet. The size of the RLP packet is determined based on the available transmission rate the transmitter 100 can use at the time. As mentioned above, the RLP layer provides its own SN in the RLP header for packet delivery to provide a mechanism for recognizing missing data packets.

The receiver 200 includes a RLP processing module 142 and a decompressor 144. The RLP processing module 142 is a conventional link layer modified to perform one or more of the embodiments of the present invention. Conventionally, the RLP processing module 142 receives the RLP packet, obtains the RTP/UDP/IP packet there from, and passes the RLP SN and transmission timing information (hereinafter interchangeably referred to as "link layer information") to the decompressor 144 along with the RTP/UDP/IP packet.

The decompressor 144 decompresses the RTP/UDP/IP packets in the well-known manner according to, for example, the ROHC algorithm.

Figure 4:
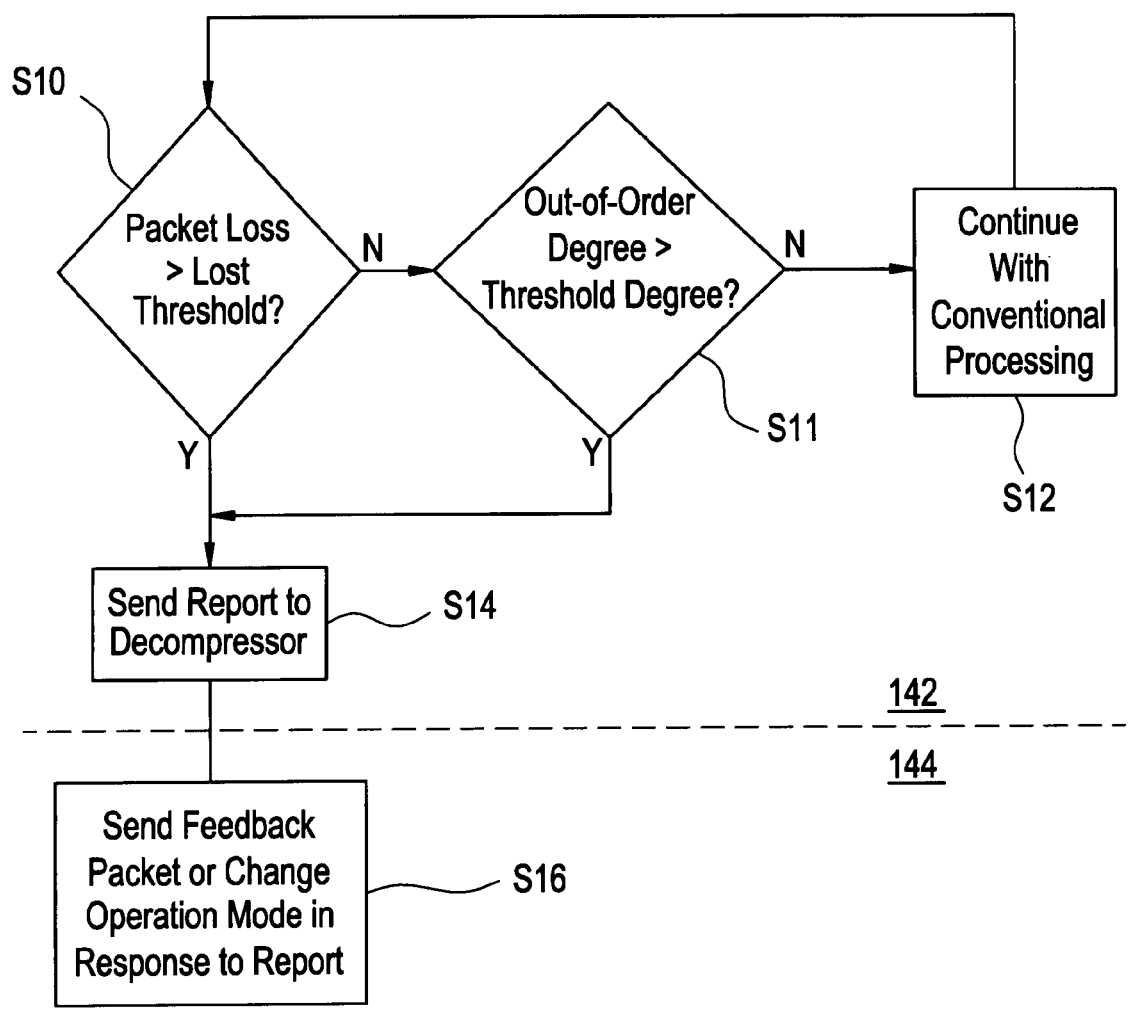
FIGS. 4-6 each illustrate a flow chart of an embodiment of the method of adaptive header compression processing according to the present invention.

FIG. 4 illustrates a flow chart of an embodiment of the method of adaptive header compression processing according to the present invention. As shown, in step S10, the RLP processing module 142 determines whether the number of consecutively lost RLP packets is greater than a lost threshold amount. The number of consecutively lost packets is defined as the number of packets lost since the last correctly received packet. The threshold amount may be a design parameter established based on the compression mode and parameter settings. For example, assume the ROHC can tolerate at most a packet loss of N RLP packets before decompression failure occurs. If the RLP processing module 142 detects that there are less than or equal to N RLP packets lost, the RLP processing module 142 then goes to step S11.

As shown, in step S11, the RLP processing module 142 determines whether the degree of out-of-order packets is larger than a degree threshold amount. Packets are out-of-order when a packet with a larger SN arrives prior to a packet with a smaller SN. For example, if the arriving RLP packet SNs are 5, 1, 2, then the packet-out-of-order degree is 5−1=4. The out-of-order threshold amount may be a design parameter established based on the compression profile and parameter settings. For example, assume that ROHC can tolerate at most P reordering packets before decompression failure occurs. If the RLP processing module 142 detects that the degree of packet out-of-order is less than or equal to P, the RLP processing module 142 continues conventional processing in step S12, and processing returns to step S10.

In step S10, if the RLP processing module 142 detects that there are more than N RLP packets lost (e.g., based on use of the error detection code and SN field in the header, as is well-known), the RLP processing module 142 informs the decompressor 144 in step S14 that the packet loss is too large and may cause decompression failure. The decompressor 144 will treat this report or notification as an indication of a potential or predicted decompression failure, and will send out a feedback packet (Negative ACK packet) in step S16 to the transmitter 100.

In step S11, if the RLP processing module 142 detects that the degree of packet out-of-order is larger than P (e.g., based on SN field in the RLP header, as is well-known), the RLP processing module 142 informs the decompressor 144 in step S14 that the packet out-of-order is too large and may cause decompression failure. The decompressor 144 will treat this report or notification as an indication of a potential or predicted decompression failure, and will send out a feedback packet (Negative ACK packet) in step S16 to the transmitter 100.

In response to the feedback packet, which indicates decompression failure and/or the need to resynchronize, the compressor 104 will send either a full header RTP/UDP/IP packet or a larger header RTP/UDP/IP packet based on the current state of the compressor 104. For example, if the compressor 104 is in the well-known initialization and refresh (IR) state, the compressor 104 will send a packet (e.g., a well-known IR packet) that contains the static information of the headers. If the compressor 104 is in the well-known first order (FO) state, the compressor 104 will send a packet (e.g., the well-known IR-DYN or other type of packet) that contains the dynamic information of the headers. If the compressor 104 is in the well-known $2^{nd}$ order (SO) state, which is the optimal compression state, the compressor 104 will send a packet with a larger size. For example, instead of sending a packet using 4 bits for the compressed RTP SN, the compressor 104 will send a packet using 6 bits for the compressed RTP SN. Thus, a longer RTP SN interval (i.e., better tolerance to consecutive packet loss) may be represented. In another example, the compressor 104 may send a packet using more bits for the compressed RTP SN to tolerate more reordering packets while still be able to handle the same packet loss.

However, in this embodiment, the state of the decompressor 144 does not change since the decompression failure is a predicted one instead of a real failure. Only the state of the compressor 104 changes since the compressor 104 sends a different packet as triggered by the feedback packet.

Figure 5:
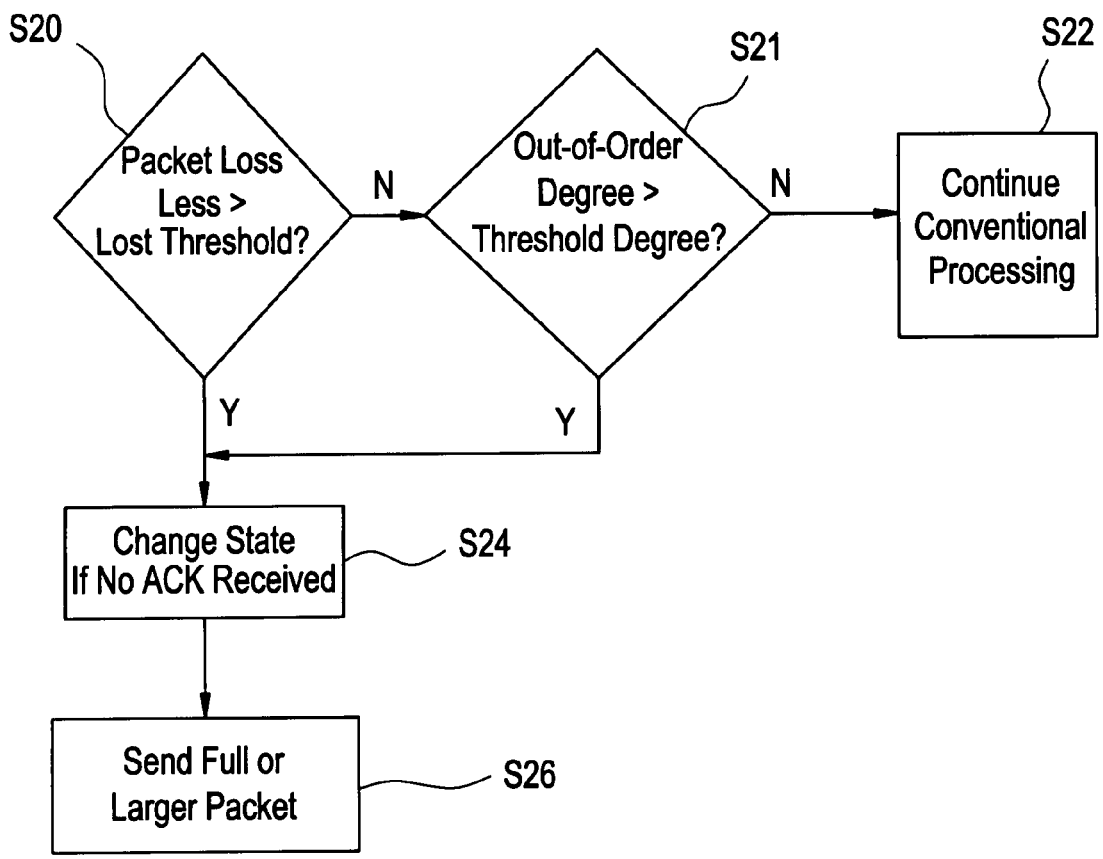

FIG. 5 illustrates a flow chart of another embodiment of the method of adaptive header compression processing according to the present invention. In this embodiment, the state at the compressor 104 may adaptively change using the link level information at the transmitter 100. As is well-known, the receiver 200, at the link layer level (RLP layer), sends acknowledgements indicating a correctly received RLP packet. Accordingly, the transmitter 100 has knowledge of how many consecutive packet losses have happened. Furthermore, based on the SN of the acknowledged packet, the transmitter 100 has knowledge of what degree of packet out-of-order has occurred. This information is passed by the link layer to the compressor 104.

As shown, in step S20, the compressor 104 determines whether the number of lost RLP packets is greater than a lost threshold amount. The lost threshold amount may be a design parameter established based on the compression mode and parameter settings. For example, as with the embodiment of FIG. 4, assume the ROHC can tolerate at most a packet loss of N RLP packets before decompression failure occurs. If the compressor 104 detects that there are less than or equal to N RLP packets lost, the compressor 104 goes to step S21.

As shown, in step S21, the compressor 104 determines whether the degree of out-of-order packets is larger than a degree threshold amount in the same manner as discussed above with respect to step S11. As stated, the out-of-order threshold amount may be a design parameter established based on the compression profile and parameter settings. For example, assume that ROHC can tolerate at most P reordering packets before decompression failure occurs. If the compressor 104 detects that the degree of packet out-of-order is less than or equal to P, the compressor 104 continues conventional processing in step S22, and processing returns to step S20.

As shown in step S20, if the compressor 104 detects that there are more than N RLP packets lost, the compressor 104 will proceed to step S24. Similarly, as shown in step S21, if the compressor 104 detects that the degree of out-of-order packets exceeds the degree threshold, processing proceeds to step S24. In step S24, the compressor 104 switches its state to a lower compression state assuming that an ACK packet has not been received. For the next RTP/UDP/IP packet to be compressed and sent after step S24, the compressor 104 will send out a full header or larger header packet in step S26. Namely, as a result of switching its state, the compressor 104 will send a larger header packet or a full header packet in the same manner as discussed above with respect to FIG. 4.

In a third embodiment of this invention, the mode of the compression/decompression can also be adaptively changed based on the link layer information and link layer characteristics. For example, the data rate channel (DRC) in the air interface of an EVDO system indicates the desirable transmission rate on the forward link. If the data rate indicates a very small value or even null, most likely the mobile is located at a poor RF position.

Figure 6:
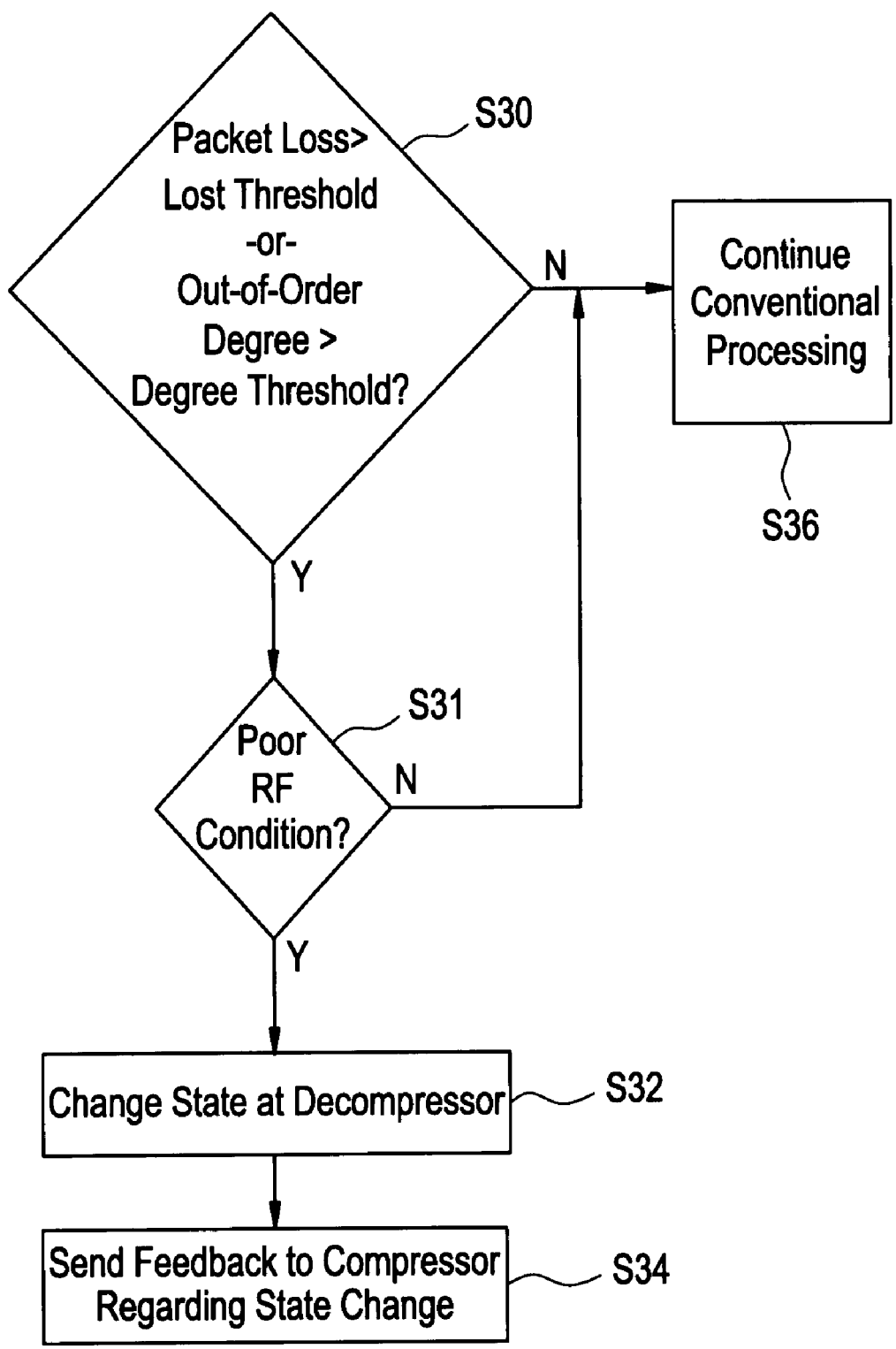

FIG. 6 illustrates a flow chart of an example of this embodiment. As shown, in step S30, if the RLP processing module 142 at the receiver 200 detects either RLP packet loss exceeding a lost threshold (e.g., as in the previous embodiments) or the degree of out-of-order packets exceeding a degree threshold (e.g., as in the previous embodiments), processing proceeds to step S31. In step S31, the RLP processing module 142 determines if poor RF conditions exist at the receiver. For example, in one embodiment, the RLP processing module may determine if the DRC rate is null. If so, then the RLP processing module 142, in step S32, instructs the decompressor 144 to change mode from the well-known Optimistic mode (O mode) to the well-known Unreliable mode (U mode). As is known, in the Unreliable mode, the decompressor 144 does not provide feedback information to the compressor 104. In step S34, the mode change information is conveyed to the compressor 104 via a feedback packet. After the mode change, the compressor 104 and decompressor 144 will be operating in the U mode, generally used if the user is experiencing poor RF conditions.

In step S30 if the RLP processing module 142 at the receiver 200 does not detect packet loss exceeding the lost threshold and does not detect a degree of out-of-order packets greater than the degree threshold, the RLP processing module continues with conventional processing. Similarly, in step S31, if the RLP processing module 142 does not determine that poor RF conditions exist at the receiver (e.g., the DRC is not null), the RLP processing module 142 continues with conventional processing in step S36.

It will be understood that this embodiment is not limited to an EVDO system or using the transmission rate as the characteristic. Instead, any characteristic indicative of poor RF conditions may be used. For example, in WCDMA or UMTS system, a channel quality indication (CQI) channel is used on the reverse link to indicate the mobile received carrier-to-interference ratio (e.g., C/I). The CQI information is used by the BTS to schedule and determine the transmission rate to the mobile. A very low C/I indicates poor RF conditions. Other types of feedback channels carrying the channel quality can be used as a good indication of mobiles' RF conditions. Furthermore, this embodiment is not limited to using a null value as the basis for judging poor RF conditions. Instead, this may be a design parameter established based on empirical study.

The invention being thus described, it will be obvious that the same may be varied in many ways. Such variations are not to be regarded as a departure from the invention, and all such modifications are intended to be included within the scope of the invention.

I claim:

1. A method, comprising:
   detecting, at a link layer level, whether packet loss of link layer packets at a receiver has exceeded a lost threshold; and
   sending feedback to a transmitter indicating that a header compressor, for compressing higher layer packets at the transmitter, should send a less compressed header if the packet loss of the link layer packets has exceeded the lost threshold, the higher layer packets being at a higher layer than the link layer and being formed by the link layer packets, wherein
   the transmitter varies compression of the header to be sent in response to the feedback according to a current state of the compressor.

2. The method of claim 1, further comprising:
   reporting from a link layer to a decompressor of the receiver that the link layer packet loss has exceeded the lost threshold if the packet loss of the link layer packets has exceeded the lost threshold, the decompressor for decompressing the higher layer packets; and wherein
   the sending step is performed by the decompressor.

3. The method of claim 1, wherein the link layer packets are radio link protocol (RLP) packets.

4. The method of claim 1, further comprising:
   maintaining a state of the decompressor unchanged even if the packet loss of the link layer packets at the receiver has exceeded the lost threshold.

5. The method of claim 1, further comprising:
   detecting whether a degree of out-of-order link layer packets at the receiver has exceeded a degree threshold; and wherein
   the sending step sends feedback to the transmitter indicating that the header compressor should send a less compressed header if the packet loss of the link layer packets has exceeded the lost threshold or if the degree of out-of-order link layer packets has exceeded the degree threshold.

6. A method, comprising:
   detecting, at a link layer level, whether a degree of out-of-order link layer packets at the receiver has exceeded a degree threshold; and
   sending feedback to a transmitter indicating that a header compressor, for compressing higher layer packets at the transmitter, should send a less compressed header if the degree of out-of-order link layer packets has exceeded the degree threshold, the higher layer packets being at a higher layer than the link layer and being formed by the link layer packets, wherein
   the transmitter varies compression of the header to be sent in response to the feedback according to a current state of the compressor.

7. The method of claim 6, further comprising:
   reporting from a link layer to a decompressor of the receiver that the degree of out-of-order link layer packets has exceeded the degree threshold if the degree of out-of-order link layer packets has exceeded the degree threshold, the decompressor for decompressing the higher layer packets; and wherein the sending step is performed by the decompressor.

8. The method of claim 6, wherein the link layer packets are radio link protocol (RLP) packets.

9. The method of claim 6, further comprising:
maintaining a state of the decompressor unchanged even if the degree of out-of-order link layer packets has exceeded the degree threshold.

10. A method comprising:
predicting decompression failure at a link layer of a receiver;
notifying a decompressor of the predicted decompression failure; and
sending feedback from the decompressor to a compressor for the compressor to reduce compression of higher layer packets, the higher layer packets being at a higher layer than the link layer and being formed from the link layer packets, wherein
the compressor varies compression of a header to be sent in response to the feedback according to a current state of the compressor.

11. A method, comprising:
detecting, at a transmitter, whether packet loss of transmitted link layer packets has exceeded a lost threshold; and
reducing header compression of higher layer packets if the packet loss of the transmitted link layer packets has exceeded the lost threshold, the higher layer packets being at a higher layer than the link layer and being formed by the link layer packets, wherein
the transmitter varies compression of the header to be sent in response to feedback received from a receiver according to a current state of a compressor.

12. The method of claim 11, wherein the link layer packets are radio link protocol (RLP) packets.

13. The method of claim 11, wherein the reducing step reduces header compression of the higher layer packets if the packet loss of the transmitted link layer packet has exceeded the lost threshold and no acknowledgement has been received for recently sent link layer packets.

14. The method of claim 11, further comprising:
detecting, at a transmitter, whether packet loss of transmitted link layer packets has excecd a lost threshold;
detecting, at the transmitter, whether a degree of out-of-order link layer packets that have been received has exceeded a degree threshold; and wherein
the reducing step reduces header compression of higher layer packets if the packet loss of the transmitted link layer packets has exceeded the lost threshold or if the degree of out-of-order link layer packets has exceeded the degree threshold.

15. A method, comprising:
detecting, at the transmitter, whether a degree of out-of-order received link layer packets has exceeded a degree threshold; and
reducing header compression of higher layer packets if the degree of out-of-order received link layer packets has exceeded the degree threshold, the higher layer packets being at a higher layer than the link layer and being formed by the link layer packets, wherein
the transmitter varies compression of a header to be sent in response to feedback received from a receiver according to a current state of a compressor.

16. The method of claim 15, wherein the link layer packets are radio link protocol (RLP) packets.

17. The method of claim 15, wherein the reducing step reduces header compression of the higher layer packets if the degree of out-of-order received link layer packets has exceeded the degree threshold and no acknowledgement has been received for recently sent link layer packets.

18. A method, comprising:
detecting, at a transmitter, at least one of (i) whether packet loss of transmitted link layer packets has exceeded a lost threshold, and (ii) whether a degree of out-of-order received link layer packets has exceeded a degree threshold; and
changing a state of a compressor of higher layer packets if at least one of the packet loss of the transmitted link layer packets has exceeded the lost threshold and the degree of out-of-order received link layer packets has exceeded the degree threshold, the higher layer packets being at a higher layer than the link layer and being formed by the link layer packets, wherein
the transmitter varies compression of a header to be sent in response to feedback received from a receiver according to a current state of a compressor.

19. A method, comprising:
detecting, at a link layer, whether packet loss of link layer packets at a receiver has exceeded a lost threshold;
detecting that a poor RF condition exists at the receiver; and
changing a state of a decompressor of higher layer packets if the packet loss of link layer packets has exceeded the lost threshold and the poor RF condition exists at the receiver, the higher layer packets being at a higher layer than the link layer and being formed by the link layer packets, wherein
a transmitter varies compression of a header to be sent in response to feedback received from the receiver according to a current state of a compressor.

20. The method of claim 19, further comprising:
sending feedback to a transmitter indicating that the state of the decompressor has changed.

21. The method of claim 19, wherein the changing step changes the state of the decompressor to a state where feedback from the decompressor to the compressor will not be supplied.

22. The method of claim 19, wherein the link layer packets are radio link protocol (RLP) packets.

23. The method of claim 19, wherein the detecting that a poor RF condition exists at the receiver is based on transmission rate.

24. A method, comprising:
detecting, at a link laver, whether a degree of out-of-order link layer packets at the receiver has exceeded a degree threshold;
detecting that a poor RF condition exists at the receiver; and
changing a state of a decompressor of higher layer packets if the degree of out-of-order link layer packets at the receiver has exceeded the degree threshold and the poor RF condition exists at the receiver, the higher layer packets being at a higher layer than the link layer and being formed by the link layer packets, wherein
a transmitter varies compression of a header to be sent in response to feedback received from the receiver according to a current state of a compressor.

* * * * *